United States Patent [19]
Nichols

[11] Patent Number: 6,041,815
[45] Date of Patent: Mar. 28, 2000

[54] ENCLOSED INDICATOR FOR A PISTON IN A CONTROL VALVE

[75] Inventor: Jimmy Brooks Nichols, Statesboro, Ga.

[73] Assignee: Micro Motion, Inc., Boulder, Colo.

[21] Appl. No.: 09/072,403

[22] Filed: May 4, 1998

[51] Int. Cl.$^7$ .................................................. F16K 37/00
[52] U.S. Cl. ........................... 137/556; 137/559; 251/33
[58] Field of Search .................... 137/553, 556, 137/559; 251/33, 41, 65; 92/5 R; 116/277

[56] References Cited

U.S. PATENT DOCUMENTS

| | | | |
|---|---|---|---|
| 1,719,686 | 7/1929 | Browne | 251/33 X |
| 2,313,448 | 3/1943 | Ludeman | 251/33 |
| 2,446,657 | 8/1948 | MacLeod et al. | 92/5 R X |
| 2,533,491 | 12/1950 | McMahon et al. | 251/65 |
| 2,638,582 | 5/1953 | Urso et al. | 137/553 X |
| 3,028,878 | 4/1962 | Natho | 137/556 |
| 3,896,280 | 7/1975 | Blake . | |
| 3,896,850 | 7/1975 | Waltrip . | |
| 3,971,412 | 7/1976 | Wierzbicki | 251/33 X |
| 3,977,423 | 8/1976 | Clayton . | |
| 4,148,339 | 4/1979 | Waltrip | 137/553 |
| 4,406,303 | 9/1983 | Kilmoyer . | |
| 4,590,967 | 5/1986 | Schmitt et al. | 137/556 X |
| 5,144,977 | 9/1992 | Eggerton et al. . | |
| 5,497,725 | 3/1996 | Theisen et al. | 116/277 |
| 5,535,698 | 7/1996 | Trevison | 137/556 X |

FOREIGN PATENT DOCUMENTS

| | | |
|---|---|---|
| 2738296 | 3/1979 | Germany . |
| 8902999 | 8/1989 | Germany . |
| 0916859 | 3/1982 | U.S.S.R. ................................. 137/553 |

OTHER PUBLICATIONS

Reference # 1 25 cited on PTO–892.

*Primary Examiner*—John Rivell
*Attorney, Agent, or Firm*—Duft, Graziano & Forest, P.C.

[57] ABSTRACT

A system for indicating a position of a piston inside a cylinder of a control valve. The indicator of the present invention has an enclosed shaft which prevents the use of the shaft to tamper with the piston. The position of the shaft inside a shaft housing is indicated using a pair of magnets a first magnet is connected to a first end of the shaft and a second magnet is slidably mounted to an outside of the shaft housing. As the shaft moves the first magnet inside the housing, the second magnet moves outside the housing. The second magnet and shaft housing are enclosed in a transparent housing to prevent damage. The shaft housing has a threaded connector for connecting the shaft housing to a valve housing over the piston to prevent leakage through the shaft housing. A groove in a second end of the shaft receives teeth from a toothed retaining ring affix the shaft to the piston. The second end of the shaft also has a tapered end to allow the shaft to be connected to the piston without removing the piston from the housing.

11 Claims, 3 Drawing Sheets

ENCLOSED INDICATOR FOR A PISTON IN A CONTROL VALVE

FIELD OF THE INVENTION

This invention relates to a valve having an indicator for indicating the position of a piston inside a cylinder. More particularly, this invention relates to a housing enclosing the indicator to prevent tampering and leakage.

PROBLEM

It is common to use a control valve to control the flow of material through a pipeline. One type of control valve has a cylinder with an inlet at a head end and an outlet in a side wall. A piston slidably affixed inside the cylinder controls the material flow through the cylinder. The position of the piston is controlled by a spring and the material flow through a control line. As the pressure from material flow on a head end of the piston overcomes the pressure from the material flow in the control line and from the spring on the back end of the piston, the piston moves allowing material to flow through the cylinder. In a closed position, the pressure from the spring and from material flow through the control line on the back end of the piston is greater than the pressure from the material on the head end of the piston. This causes the head of the piston to be pressed against the head end of the cylinder which prevents material from flowing through the cylinder.

It is a problem to provide a system for indicating the amount of material flowing through a cylinder valve. One system used to display the amount of material flow is an indicator. An indicator can be a stem or shaft having one end attached to a piston and a second end protruding from a valve housing. As the piston moves in the cylinder, the length of shaft protruding from the housing changes to indicate the position of the piston in the cylinder which, in turn, indicates the material flow through the cylinder.

There are two problems with an indicator having a protruding shaft. The first problem is leakage. Since the shaft of the indicator is connected to the piston inside the cylinder, it is possible that material may leak from the cylinder through the shaft opening in the housing. Even if adequate measures are taken to seal the opening, it is possible for material to leak through the opening. Leakage typically occurs when a seal, such as an o-ring, deteriorates from wear, age, or corrosion.

A second problem is tampering. Since the shaft is directly connected to the piston, it is possible to pull the shaft outwards to move the piston into an open position in the cylinder and allow material to flow through the cylinder. Operators can use the shaft to open the valve and steal material from the pipeline. There is a need in the art for an indicator that prevents leaks and is tamper proof.

SOLUTION

The above and other problems are solved and an advance in the art is made by the provision of an enclosed indicator. A first advantage of an enclosed indicator is that the enclosed indicator is tamper proof because a shaft of the indicator is enclosed inside a housing. A second advantage of the enclosed indicator is that the enclosed indicator is leak proof because a indicator housing can be threaded into a control port of the valve. A third advantage of the enclosed indicator is that the enclosed indicator can be installed into the control valve without disassembling the valve and replacing the piston with a new piston having a connected indicator shaft.

An enclosed indicator is provided in the following manner. A shaft is slidably mounted into a shaft housing. A first end of the shaft is enclosed in the housing and a second end of the shaft is connected to a piston inside the cylinder. The shaft slides inside the shaft housing as the piston slides in the cylinder. A disc magnet is affixed to the first end of the shaft. A ring magnet is slidably affixed to the outside of the shaft housing. Magnetic attraction causes the ring magnet to slide along the outside of the shaft housing as the shaft slides the disc magnet along inside the shaft housing. The position of the ring magnet on the outside of the shaft housing indicates the position of the piston in the cylinder. The ring magnet is enclosed by a transparent housing to prevent damage to the indicator while allowing a user to view the indicator. The shaft housing is affixed to the control valve by a threaded connector which fits into a mated control port in the housing. The second end of the shaft has a groove around the circumference of the shaft. Teeth from a toothed retaining ring affixed to the end of the piston slip fit into the groove of the shaft and to securely affix the shaft to the piston. The second end of the shaft is tapered to guide the shaft into the toothed retaining ring during installation of the shaft. This allows the shaft to be inserted into the control port and connected to the piston without removing the piston from the cylinder. threaded connector that is threaded into a control port of the valve housing.

DESCRIPTION OF THE DRAWINGS

The above and other features of this invention can be understood from reading of the below Detailed Description and the following drawings.

DETAILED DESCRIPTION

Figure 1:
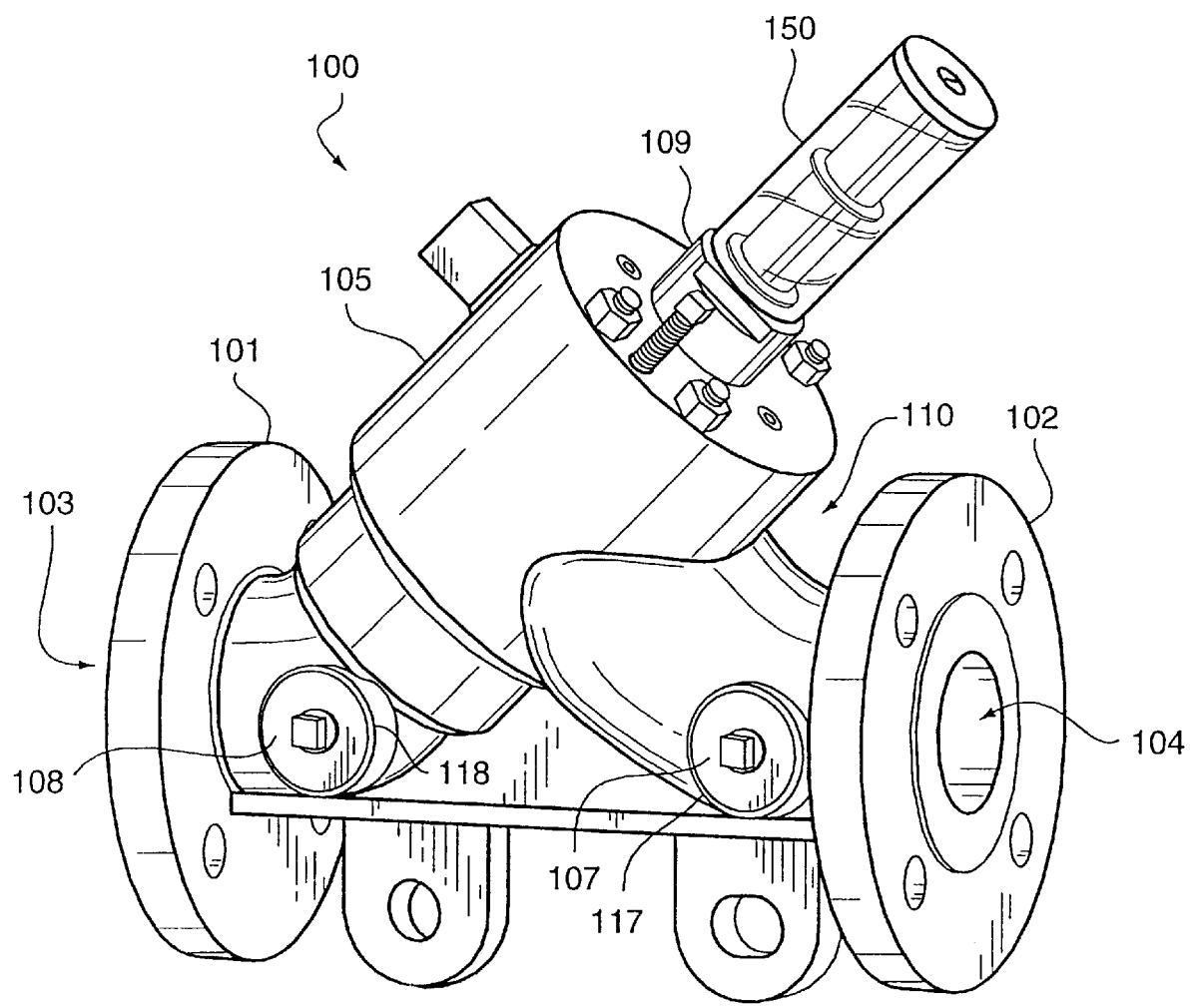
FIG. 1 illustrates a common control valve incorporating an enclosed indicator of the present invention.

FIG.1 discloses control valve 100 having a housing 110. Inlet flange 101 and outlet flange 102 connect control valve 100 to a pipeline (not shown). Material flows into control valve 100 through inlet 103 and exits control valve 100 through outlet 104. Piston assembly housing 105 forms a cylindrical cavity between inlet 103 and outlet 104. A piston assembly (illustrated in FIG. 2) is contained inside piston assembly housing 105 and regulates the flow of material through control valve 100.

Figure 2:
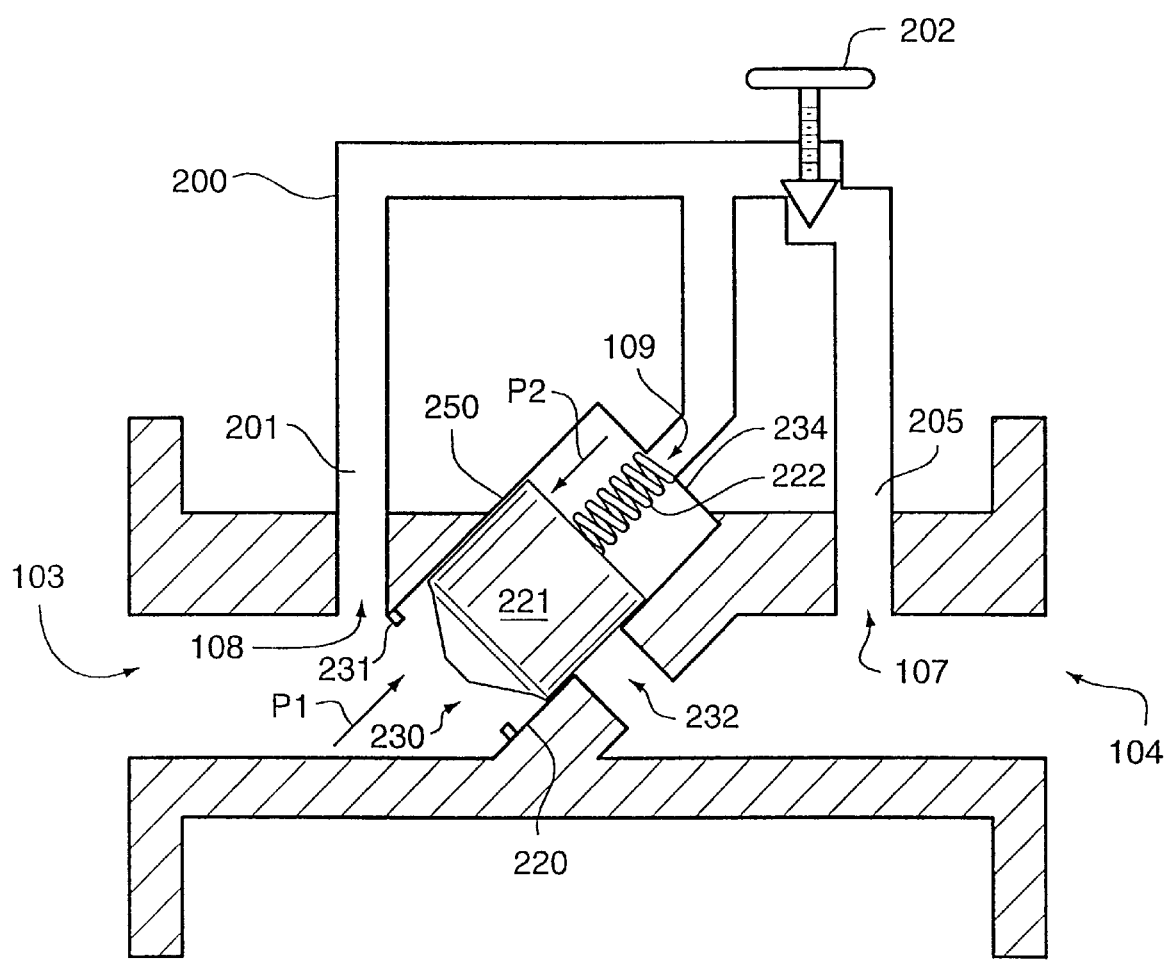
FIG. 2 illustrates a cross sectional view of the common control valve without an indicator to explain operation of the control valve.

Control inlet 108 is an opening in housing 110 proximate inlet 103 to divert material into a control line (shown in FIG. 2). Control inlet 108 is illustrated with a plug 118 threading into control inlet 108. Control opening 109 is an opening in cylinder cover 106 on a top side of piston assembly housing 105 for applying a flow from a control line (shown in FIG. 2) to a second end of a piston. Indicator 150 is threaded into control opening 109. Control outlet 107 is an opening in housing 100 proximate outlet 104 to return material to control valve 100 from a control line. Plug 117 is illustrated threaded inside control outlet 107.

FIG. 2 is a cross sectional view of control valve 100 connected to control line 200 without an indicator 150. FIG.2 discloses the operation of control valve 100. Control line 200 has a first end 201 connected to control inlet 108 for receiving material from the inlet of control valve 100. The material flows through control line 200 to a conduit connected to control opening 109. The material then flows though control opening 109 into a cylinder 220 of piston assembly 250. A control pilot valve 202 is down stream of control opening 109 in control line 200. Control pilot valve 202 is a faucet assembly that can be adjusted to regulate the flow of material through control line 200. A second end 205 of control line 200 is connected to control outlet 107 to return material from control line 200 to the material flowing out of outlet 104.

Piston assembly 250 comprises a cylinder 220 and piston 221. Piston 221 is slidably mounted in cylinder 220. Cylinder 220 has head end 231 with an inlet opening 230 that is proximate the inlet 103 for receiving a flow of material from inlet 103. Outlet opening 232 is in a side wall of cylinder 220 and allows material to flow through cylinder 220 to outlet 104. Piston 221 slides inside cylinder 220 to regulate the flow of material through cylinder 220. In a closed position, piston 221 is pressed against head end 231 and prevents fluid from flowing into cylinder 220. In an open position, piston 221 slides to a second end 234 of cylinder 220 and the flow path between inlet 230 and outlet 232 is unobstructed. Piston 221 can also be in a position anywhere between the open and closed positions to partially obstruct the flow path and regulate the flow of material through cylinder 220.

Spring 222 has a first end fixedly attached to an upper inside wall of cylinder 220 and a second end fixedly attached to a second end of piston 221. Spring 222 is used to control the position of piston 221 inside cylinder 220. The position of piston 221 is controlled based upon a balanced pressure principle. The flow of material from inlet 103 and spring 222 combine to apply a pressure of P1 to the head side of piston 221. Pressure P2 is applied to a back side of piston 221 by spring 222 and the material flow through control port 109 from control line 200.

When pilot valve 202 is closed material cannot flow to control outlet 107. This causes pressure P2 on the second end of piston 221 to be greater than pressure P1 on the head end of piston 221. This biases piston 221 to the closed position when pilot 202 is closed. When pilot valve 202 is open the material flow to control outlet 107 reduces pressure P2 on the second end of piston 221. The force applied by P1 overcomes the force applied by P2 and piston 221 is pushed towards the open position. Material is then allowed to flow through cylinder 220. The more pilot valve 202 is opened the more P2 is reduced which in turn controls the height of piston 221 in cylinder 220.

Figure 3:
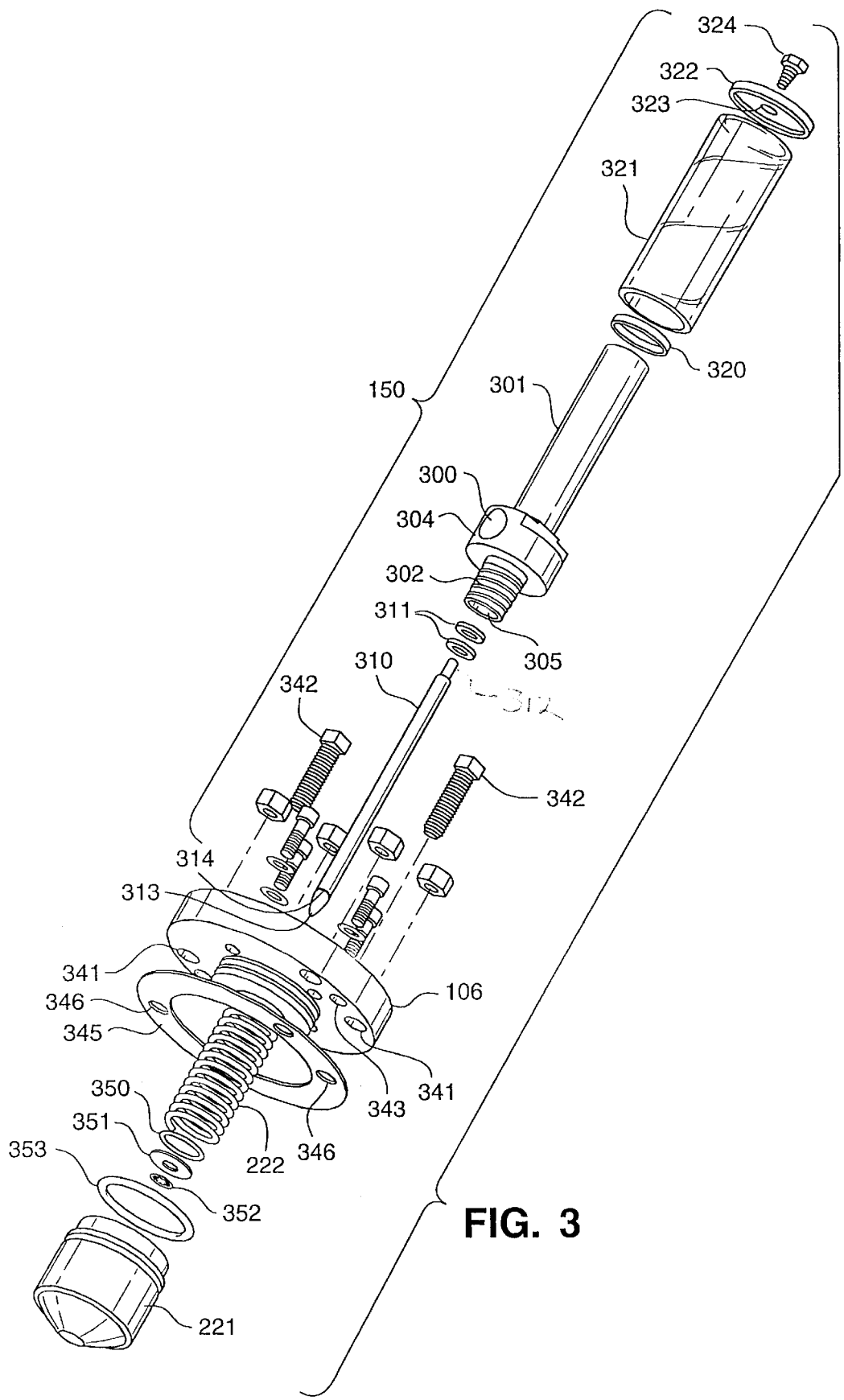
FIG. 3 illustrates an exploded view of preferred exemplary embodiment of an enclosed indicator system connected to a piston of a control valve.

FIG. 3 illustrates a preferred embodiment of indicator 150 connected to piston 221. Platform 300 forms the base of indicator 150. Platform 300 is a cylindrical piece of metal or other solid substance that can withstand corrosion from contact with the material flowing through control valve 100. An opening 305 is bored through the center of platform 300 from a first end to a second end. Shaft housing 301 is a long narrow cylindrical shaft enclosing opening 305 on a first end of platform 300. Control opening connector 302 is a threaded cylindrical ring enclosing opening 305 on the second side of platform 300. Control opening connector threads into control opening 109 of piston assembly housing cover 106 to connect indicator 150 to housing 110. Control inlet 304 is an opening in the side of platform 300 to connect a control line to indicator 150 to apply a material flow to piston 221 through indicator 150.

Shaft 310 is slidably engaged inside opening 305 with a first end extending into shaft housing 301 and a second protruding from control opening connector 302. Disc magnets 311 are affixed to nib 312 of shaft 310. The second end of shaft 310 has a tapered point 313. Tapered point 313 is used to guide shaft 310 into toothed retaining ring 352 to facilitate installation of indicator 150 without removing piston 221 from cylinder 220.

Toothed retaining ring 352 is positioned in a notch (not shown) in a back side of piston 221 and is held in place by washer 351 and retaining ring 350. Groove 314 around the circumference shaft 310 fits into toothed retaining ring 352 to attach shaft 310 to piston 221. The teeth of toothed retaining ring 352 slip fit into groove 314 and securely affix shaft 310 to piston 221. After shaft 310 is connected to piston 221, movement by piston 221 inside cylinder 220 causes the first end of shaft 310 to move inside shaft housing 310 in the same direction as piston 221 is moving.

The position of piston 221 is indicated using ring magnet 320. Ring magnet 320 is slidably affixed to the outside wall of shaft housing 301. Ring magnet 320 is magnetically attracted to disc magnets 311 inside shaft housing 301 and slides along the outside wall of housing 301 as shaft 310 moves disc magnets 312 inside shaft housing 301. The position of ring magnet 320 on shaft housing 301 indicates the position of piston 220 inside cylinder 220.

Clear housing 321 is a cylindrical ring of a transparent material enclosing ring magnet 320 and shaft housing 301 to prevent damage to indicator 150. Cap 322 affixes clear housing 321 to indicator 150 by receiving the edges of clear housing 321 and being affixed to a first end of shaft housing 301. Screw 324 is threaded into an aperture 323 in cap 322 and an aperture (not shown) on the first end of shaft housing 310.

Piston assembly cover 106 is fixedly attached to piston assembly housing 105 (shown in FIG. 1) by screws 342 and holes 341, openings 346 of gasket 345 and mated openings (not shown) in piston assembly housing 105 (shown in FIG. 1). Gasket 345 is positioned between piston assembly cover 106 and piston assembly housing 105 to prevent leakage from between the housing and the cover. It is advantage of the present invention that piston assembly cover 106 does not have to be removed to install indicator 150. Instead, shaft 310 is guided into toothed retaining 352 by tapered end 313 until toothed retaining ring 352 is received into groove 314. Control opening connector 302 is then fitted over shaft 310 with shaft 310 being slidably received into opening 305 and extending into shaft housing 301. Control opening connector 302 is then threaded into control opening 109. Control line 200 (shown in FIG. 2) can then be attached to control inlet 304 to complete installation.

The above description is of one exemplary embodiment of an enclosed indicator. It is envisioned one skilled in the reading the above description can and will design alternative enclosed indicators that infringe on the invention set forth in claims below either literally or through the Doctrine of Equivalents.

What is claimed is:

1. Apparatus for indicating a position of a movable device inside an assembly comprising:

a housing;

a shaft slidably mounted inside said housing;

a first end of said shaft positioned inside said housing;

a second end of said shaft protruding from an opening in said housing into said assembly;

a groove around the circumference of said shaft proximate said second end that receives teeth from a toothed retainer ring affixed to said movable device to fixedly engage said shaft and said movable device;

said first end of said shaft sliding inside said housing responsive to said movable device moving inside said assembly; and means on said outside of said housing for indicating a position of said first end of said shaft inside said housing.

2. The apparatus of claim 1 further comprising:

connector means for affixing said housing to an assembly housing.

3. The apparatus of claim 2 wherein said connector means is threaded and said assembly housing comprises:

means for receiving said threaded connector means.

4. The apparatus of claim 1 wherein said said movable device is a piston inside a cylinder.

5. The apparatus of claim 1 wherein said means for indicating said position of a first end of said shaft inside said housing comprises:

a first magnet means affixed to said first end of said shaft inside said housing;

a second magnet means slidably mounted on said outside of housing and having a magnetic attraction to said first magnet means which causes said second magnet means to slide along said outside of said housing responsive to said shaft moving said first magnetic means.

6. The apparatus of claim 5 further comprising:

a transparent housing enclosing said housing and said second magnetic means for preventing damage to said means for indicating.

7. The apparatus of claim 1 further comprising:

means for connecting a control line to a flowing system through said apparatus.

8. The apparatus of claim 7 wherein said means for connecting said control line comprises:

a control line opening in a side of said housing allowing a material flow into said housing; and an outlet through said opening in said housing for said shaft.

9. The apparatus of claim 1 wherein said groove facilitates blind insertion of said second end of said shaft into said movable device.

10. Apparatus for indicating a position of a movable device inside an assembly comprising:

an indicator housing;

a first magnet means inside said indicator housing;

a shaft;

a first end of said shaft protruding into said indicator housing and engaged with said first magnet means for sliding said first magnet means inside said housing to a position in said indicator housing indicating a position of said device in said assembly;

a second end of said shaft protruding from an opening in said housing into said assembly;

a groove around the circumference of said shaft proximate said second end that receives teeth from a toothed retainer ring affixed to said movable device to fixedly engage said shaft and said movable device; and a second magnet means slidably mounted on an exterior said indicator housing and magnetically attracted to said first magnet means which causes said second magnet means to move to a position along the exterior of said indicator housing to display an indication of said position of said device.

11. An apparatus for indicating a position of a movable piston inside a cylinder comprising:

a shaft housing;

a shaft;

a first end of said shaft slidably mounted inside said shaft housing;

a second end of said shaft protruding through an opening in said shaft housing into said cylinder;

a groove around the circumference of said shaft proximate said second end for receiving teeth from a toothed retainer ring affixed to an end of said piston to fixedly engage said shaft to said piston;

a first magnet means affixed to said first end of said shaft inside said housing;

a second magnet means slidably mounted on an outside of said shaft housing and magnetically attracted to said first magnet means which causes said second magnet means to slide to a position along said shaft housing to indicate said position of said piston in said cylinder;

a transparent housing enclosing said second magnet means and said shaft housing; and a threaded means for connecting said shaft housing to a cylinder housing.

* * * * *

UNITED STATES PATENT AND TRADEMARK OFFICE
CERTIFICATE OF CORRECTION

PATENT NO.   : 6,041,815
DATED        : March 28, 2000
INVENTOR(S)  : Jimmy Brooks Nichols It is certified that error appears in the above-identified patent and that said Letters Patent is hereby corrected as shown below:

Title page,
Item 73 Assignee, replace "Micro Motion, Inc., Boulder, Colo."
with -- Emerson Electric Co., Inc., St. Louis, Missouri --.

Signed and Sealed this

Twenty-eighth Day of August, 2001

*Attest:*

*Attesting Officer*

NICHOLAS P. GODICI
*Acting Director of the United States Patent and Trademark Office*